Inventors:
Engelhard Koch
Karl Fischer
BY Spencer & Kaye
ATTORNEYS 3,534,133
METHOD OF PREPARING SEAMLESS NON-CYLINDRICAL INSULATORS
Engelhard Koch and Karl Fischer, Kassel, Germany, assignors to Licentia Patent - Verwaltungs - G.m.b.H., Frankfurt am Main, Germany
Filed Aug. 19, 1966, Ser. No. 573,543
Int. Cl. B28b 7/06; B29c 1/02, 1/12
U.S. Cl. 264—314
3 Claims

ABSTRACT OF THE DISCLOSURE

Method of making an electrical insulator having a seamless non-cylindrical surface portion. Resin is cast into an expanded sleeve formed of an organic thermoplastic material and having an inner surface shaped to correspond to the non-cylindrical surface portion of the insulator being made. After hardening of the resin, the sleeve is removed from the surface of the insulator.

---

The present invention relates to electrical insulators, and more particularly, to insulators having a seamless, unbroken surface finish.

The invention also resides in a method for making such insulators as well as in a mold which is suitable for use in this method. The insulators themselves may be supporting insulators, or bushing-type insulators, or any other similar type of electrical insulator.

Conventionally, molded resin insulators having shielding rings are made in two-piece molds. This means that after that after the molding operation, the insulators have to be finished in order to remove the burr or seam which as a result of overflow along the parting plane of the mold, is formed on the article along the line where two parts of the mold meet. As a result, the integrity of the surface of the insulator is broken in that the insulator loses its surface finish or glaze at those places where the burr was removed. The practical significance of this is that this adversely affects the electrical insulating characteristics of the surface of the insulator, i.e., the skin resistance of the insulator is decreased.

Various attempts have been made to overcome the above drawback, one of them being by applying one or more coatings on the surface of the insulator in order to obtain a seamless and unbroken surface. Not only has this been found not to yield the desired result, but also, the application of the additional coating or coatings increased the costs of the finished product.

It is, therefore, the primary object of the present invention to provide a way in which to overcome the above drawbacks, namely, to provide a way of making molded resin insulators having a seamless surface, in such a way as to overcome the above-described drawbacks.

It is a further object of the present invention to provide a method of making such insulators by using a simple mold.

It is another object of the present invention to provide a way of making an insulator having a seamless surface without it being necessary to work the inside of the mold either before or after the molding operation.

With the above objects in view, the present invention resides, basically, in a mold for use in making an electrical insulator having a seamless non-cylindrical, e.g., a corrugated surface portion, which mold has a sleeve made of an organic thermoplastic material and extending at least throughout the length of the non-cylindrical surface portion of the insulator to be molded. The sleeve is self-supporting and has an inner surface configuration which corresponds exactly to the configuration of the non-cylindrical surface portion of the insulator to be molded.

The present invention further resides in a method of making such electrical insulator having a seamless non-cylindrical surface portion, which method comprises the steps of casting resin into an expanded sleeve of the above-described type, and, after hardening of the resin, removing the sleeve from the surface of the insulator.

Additional objects and advantages of the present invention will become apparent upon consideration of the following description when taken in conjunction with the accompanying drawings in which.

Figure 1:
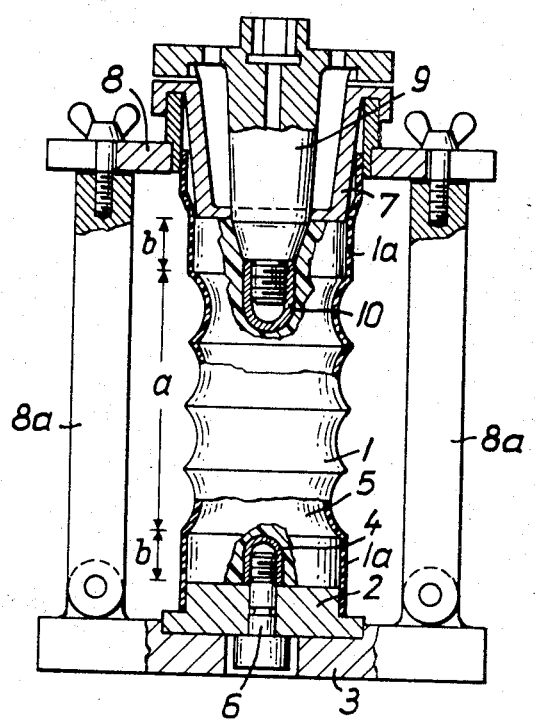
FIG. 1 is an elevational view, partly in section, of a mold according to the present invention.

Referring now to the drawings and first to FIG. 1 thereof, the same shows a mold having a sleeve 1 which is a one-piece, self-supporting sleeve made of a suitable organic thermoplastic material, such as an olefin polymer or copolymer or a mixed polymer or copolymer. The sleeve 1, which may be in sheet form, extends throughout the length a of the non-cylindrical surface portion of the insulator 5 and has an inner configuration which corresponds exactly to the configuration of the non-cylindrical surface portion of the insulator to be molded.

The sleeve 1 is carried on a base plate 2 which itself is mounted on a frame 3. The base plate 2 also carries a screw 6 whose upper end is in threaded engagement with a nut 4 which is ultimately cast into the insulator. In this way, the nut is held by the frame during the casting operation; after the casting operation, the screw 6 is removed and the nut 4 is left in the finished insulator 5.

A casting funnel 7 is held in place above the upright sleeve 1 by means of an upper plate 8 which is screwed to links 8a that are pivotally connected to the frame 3. Arranged in the funnel 7 is a screw 9 whose lower threaded end carries a further nut 10 which is likewise cast into the insulator.

As shown in FIG. 1, the sleeve 1, besides having a portion which gives the insulator its non-cylindrical surface, also has portions 1a which give the insulator end portions having cylindrical surfaces, these end portions extending through the lengths b shown in FIG. 1.

Figure 2:
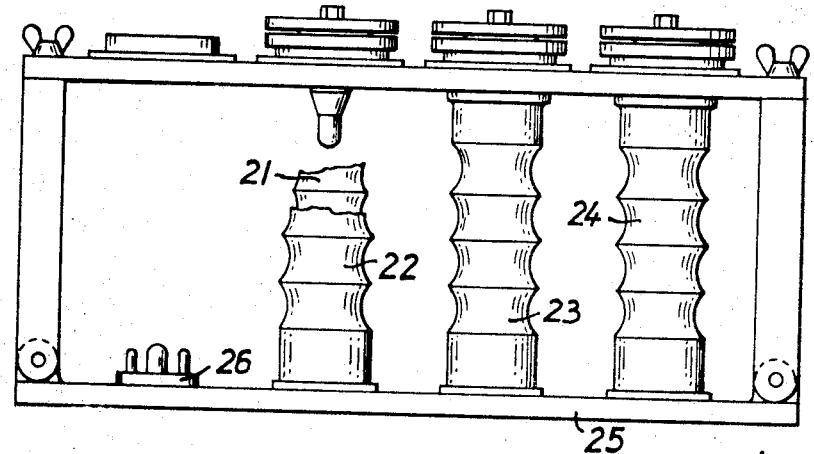
FIG. 2 is an elevational view, partly cut away, of a multiple mold according to the present invention.

FIG. 2 shows a multiple mold according to the present invention for making a plurality of insulators 21. The multiple mold incorporates a plurality of self-supporting one-piece sleeves 22, 23, 24 which can be placed on base plates mounted on a frame 25. Shown at 26 is a base plate supporting three nuts which are to be cast into an insulator.

The insulator is produced by casting a resin into the expanded sleeve. In practice, the sleeve may be expanded by blowing the same up, i.e., by forcing air under pressure into the sleeve. After the resin has been poured and has hardened, the sleeve is removed from the surface of the insulator.

As a practical matter, the sleeve may be left on the insulator until such time as the insulator is used, so that the sleeve will have served not only as the mold, but also as a packing sheath which protects the surface of the insulator until such time as the insulator is to be unpacked. The sleeve can then simply be removed, for example, by pulling it off the insulator.

The particular organic thermoplastic material of which the sleeve is made will depend on the particular shape-retaining characteristics which the sleeve has to have, and this, in turn, will depend on the casting temperature and the hardening characteristics of the resin of which the insulator is made. Experience has shown that sleeves cut from polyethylene tubes, made by conventional blow molding techniques, are best suited when the insulator is made of an epoxy resin which can be set by heat.

As stated above, the sleeve can be made of a suitable polymer or copolymer or mixture thereof. In practice, polyethylene and polypropylene have been found to be suitable. For example, if the material of which the insulator is to be made is a mixture of a liquid resin with a setting agent, to which a filler as, for example, granulated quartz, has been added, and if this material is to be cast at about 95° C., the sleeve is suitably made of a low pressure polyethylene. After the resin has been poured into the mold, the end pieces are provided. At a temperature of about 95° C., it takes about two hours for the resin to harden.

After the screws have been taken out of the nuts embedded in the end portions of the insulator, the latter may undergo whatever finishing steps may be needed.

If the resin is of a type which sets at room temperature and which, prior to casting, has to be liquefied at a relatively high temperature, the sleeve will be made of a material which is capable of withstanding such higher temperatures, for example, polypropylene.

In short, the sleeve will be made of whatever organic thermoplastic plastic which will meet the particular requirements, such as polycarbonates or polyurethanes, polymers or copolymers of olefin monomers, especially of the type mentioned above.

As also explained above, the sleeve may be provided with one or two integral end portions which form mold parts for molding either or both end portions of the insulator. In the illustrated embodiment, the end portions are cylindrical in contradistinction to the non-cylindrical midportion of the insulator.

It will be understood that the above description of the present invention is susceptible to various modifications, changes and adaptations, and the same are intended to be comprehended within the meaning and range of equivalets of the appended claims.

What is claimed is:
1. A method of making an electrical insulator having a seamless non-cylindrical surface portion comprising the steps of:
    (a) preparing a mold for making an electrical insulator having a seamless non-cylindrical surface portion by expanding an elastic sleeve formed of an organic thermoplastic material selected from the group consisting of the polyolefins, polycarbonate and polyurethane, whose inner surface configuration corresponds exactly to the non-cylindrical surface portion of the insulator being made;
    (b) casting a hardenable resin into the said expanded thermoplastic sleeve; and
    (c) after hardening of the casting resin, removing the said sleeve from the surface of the insulator, wherein the said removal is accomplished without requiring treatment of the mold before or after the molding operation.

2. A method as defined in claim 1 wherein the said sleeve is formed of an organic thermoplastic polyolefin selected from the group consisting of polyethylene and polypropylene.

3. A method as defined in claim 1 wherein the said sleeve is expanded by forcing air under pressure thereinto.

References Cited

UNITED STATES PATENTS

| 2,246,332 | 6/1941 | Whiteley | 264—313 |
| 3,100,676 | 8/1963 | Christie | 264—317 |
| 3,184,210 | 5/1965 | Fassnacht et al. | 264—313 |
| 3,277,350 | 10/1966 | Pearce et al. | 264—272 |
| 3,338,990 | 8/1967 | Rice et al. | 264—313 |

ROBERT F. WHITE, Primary Examiner

J. R. THURLOW, Assistant Examiner

U.S. Cl. X.R.

18—34; 249—127, 134; 264—272